United States Patent
Gonzalez Martin et al.

(10) Patent No.: US 11,654,632 B2
(45) Date of Patent: May 23, 2023

(54) VALIDATION OF OBJECT MODEL DIMENSIONS FOR ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Jordi Gonzalez Rogel, Sant Cugat del Valles (ES); Roger Tarres Noguera, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/734,574

(22) PCT Filed: Jan. 24, 2019

(86) PCT No.: PCT/US2019/014994
§ 371 (c)(1),
(2) Date: Dec. 3, 2020

(87) PCT Pub. No.: WO2020/153964
PCT Pub. Date: Jul. 30, 2020

(65) Prior Publication Data
US 2021/0339475 A1    Nov. 4, 2021

(51) Int. Cl.
*B29C 64/386* (2017.01)
*B33Y 50/00* (2015.01)
*B22F 10/80* (2021.01)
*G05B 19/4099* (2006.01)
(Continued)

(52) U.S. Cl.
CPC ............ *B29C 64/386* (2017.08); *B22F 10/80* (2021.01); *B33Y 50/00* (2014.12);
(Continued)

(58) Field of Classification Search
CPC ... B29C 64/386; B29C 64/165; B29C 64/393; B22F 10/80; B22F 10/85; B33Y 50/00;
(Continued)

(56) References Cited

U.S. PATENT DOCUMENTS 5,274,751 A * 12/1993 Rosenberg ............ G06F 3/1284
358/1.6
7,209,797 B2    4/2007 Kritchman et al.
(Continued)

FOREIGN PATENT DOCUMENTS

WO    WO2017099804 A1    6/2017

*Primary Examiner* — Thomas C Lee
*Assistant Examiner* — Michael Tang
(74) *Attorney, Agent, or Firm* — Michael Dryja

(57) ABSTRACT

In an example, a method includes receiving, at a processor, object model data representing an object that is to be generated by an additive manufacturing apparatus by fusing build material within a fabrication chamber wherein a dimensional compensation has been applied to the object model data based on an expected object placement position. The method may comprise receiving, from the additive manufacturing apparatus, an indication of an object generation placement position within a fabrication chamber where the object is to be generated and comparing, by the processor, the expected object placement position with the object generation placement position. If the expected object placement position matches the object generation placement position, the method may comprise determining, by the processor, that the dimensional compensation is valid and otherwise determining, by the processor, that the dimensional compensation is invalid.

14 Claims, 4 Drawing Sheets

(51) Int. Cl.
 *G06F 30/10* (2020.01)
 *G06F 113/10* (2020.01)

(52) U.S. Cl.
 CPC .............. *G05B 19/4099* (2013.01); *G05B 2219/49023* (2013.01); *G06F 30/10* (2020.01); *G06F 2113/10* (2020.01)

(58) Field of Classification Search
 CPC .... B33Y 10/00; B33Y 50/02; G05B 19/4099; G05B 2219/49023; G06F 30/10; G06F 2113/10; Y02P 10/25
 See application file for complete search history.

(56) References Cited

U.S. PATENT DOCUMENTS

| | | | |
|---|---|---|---|
| 9,159,106 B1 | 10/2015 | Bedell et al. | |
| 9,481,134 B2 | 11/2016 | Steiner et al. | |
| 9,718,129 B2 | 8/2017 | Ljungblad et al. | |
| 9,770,869 B2 | 9/2017 | Comb et al. | |
| 2007/0170917 A1* | 7/2007 | Thompson | G01R 33/5616 324/318 |
| 2008/0158274 A1 | 7/2008 | Tasaka | |
| 2013/0103224 A1* | 4/2013 | Egami | H01M 8/04582 700/297 |
| 2014/0371895 A1 | 12/2014 | Sadusk et al. | |
| 2015/0298474 A1 | 10/2015 | Rossell et al. | |
| 2016/0354980 A1* | 12/2016 | Ho | B29C 64/40 |
| 2017/0120522 A1* | 5/2017 | Skubic | B33Y 10/00 |
| 2017/0235294 A1 | 8/2017 | Shapiro et al. | |
| 2017/0291367 A1 | 10/2017 | Burlatsky et al. | |
| 2017/0310935 A1 | 10/2017 | Sinclair | |
| 2018/0307209 A1* | 10/2018 | Chin | B22F 1/10 |
| 2019/0054700 A1* | 2/2019 | Chandar | G06F 17/18 |
| 2021/0039169 A1* | 2/2021 | Wu | B22F 5/00 |
| 2021/0060850 A1* | 3/2021 | Menchik | B29C 64/112 |
| 2021/0229182 A1* | 7/2021 | Yamasaki | B23K 9/04 |
| 2021/0299753 A1* | 9/2021 | Hartmann | B22F 10/66 |

* cited by examiner

VALIDATION OF OBJECT MODEL DIMENSIONS FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF THE DRAWINGS

Non-limiting examples will now be described with reference to the accompanying drawings, in which.

DETAILED DESCRIPTION

Figure 1:
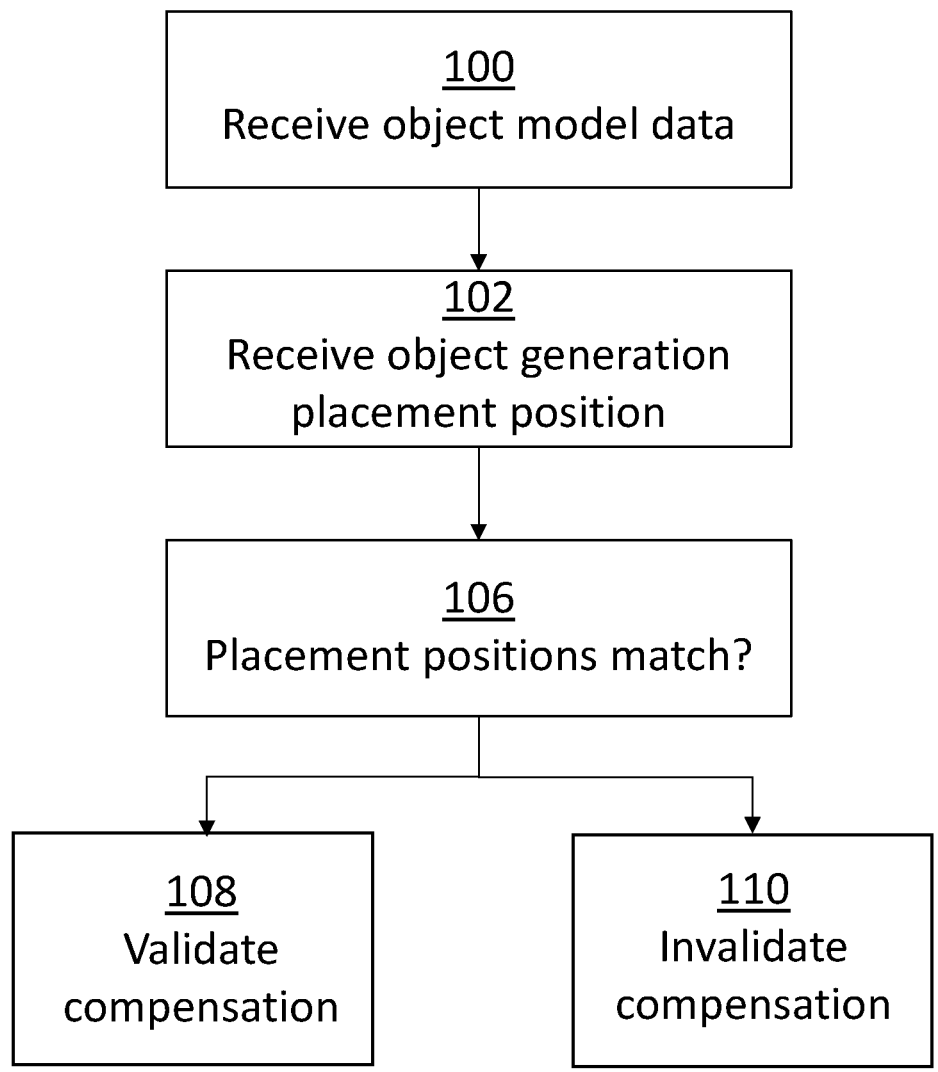
FIG. 1 is a flowchart of an example method of performing a validation check on object model data.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies, upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise an infra-red light absorber. In one example such a fusing agent may comprise a near infra-red light absorber. In one example such a fusing agent may comprise a visible light absorber. In one example such a fusing agent may comprise a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, the detailing agent may be used near edge surfaces of an object being printed. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

FIG. 1 shows a method, which may be a method of performing a validation check for dimensional compensation of object model data for additive manufacturing. The method of FIG. 1 is to be carried out by a processor, which may comprise, for example, any suitable processing circuity, a single processor or a plurality of linked processors.

The method comprises, in block 100, receiving, at a processor, object model data representing an object that is to be generated by an additive manufacturing apparatus by fusing build material within a fabrication chamber wherein a dimensional compensation has been applied to the object model data based on an expected object placement position. Applying a dimensional compensation to object model data may comprise modifying a dimension or dimensions of the object to be fabricated to compensate for shrinkage or expansion of the object or parts of the object that may occur due to the fabrication process, as explained in more detail below.

The object (or, in some examples, a batch of objects including the object) represented by the object model data is to be generated by an additive manufacturing apparatus by fusing build material, for example by thermal fusion. The object model may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object region as a plurality of sub-volumes, wherein each sub-volume represents a region of the object which is individually addressable in object generation. In some examples herein, the sub-volumes may be referred to as voxels, i.e. three-dimensional pixels.

In one example, additive manufacturing apparatus may generate objects using object generation instructions, based on the object model data, the object generation instructions specifying an amount of print agent to be applied to each of a plurality of locations on a layer of build material. For example, object generation instructions may comprise determining 'slices' of a virtual build volume, and rasterising these slices into pixels (or voxels, i.e. three-dimensional pixels). An amount of print agent (or no print agent) may be associated with each of the pixels/voxels. For example, if a pixel relates to a region of a build volume which is intended to solidify, the object generation instructions may specify that fusing agent should be applied to a corresponding region of build material in object generation. If however a pixel relates to a region of the build volume which is intended to remain unsolidified, then object generation instructions may specify that no agent, or a coalescence modifying agent such as a detailing agent, may be applied thereto. In addition, the amounts of such agents may be specified in the instructions and these amounts may depend on thermal considerations and the like.

Dimensional compensation may be used to compensate for anticipated departures from intended dimensions when generating an object. For example, it may be the case that when an object is generated in a process which includes heat, such as an additive manufacturing process which comprises forming layers of build material and selectively solidifying a portion or portions of each layer by thermal fusion, additional build material may adhere to the object on generation. To consider a slice or layer of an object, in an example, print agent may be applied (and/or object generation instructions may be specified) with a resolution of around 600 dpi (dots per inch) or 1200 dpi. In other examples, other resolutions may be used for control instructions and/or print agent application. 600 dpi allows a uniquely addressable region of 42 by 42 microns in cross section, and thus voxels may be defined to relate to a 42 by 42 micron region. Print agent may be associated with a group of voxels, which in turn correspond to regions of the layer. However, when fusing agent has been applied and energy is supplied, build material of neighboring regions/voxels may become heated and fuse to the outside of the object (in some examples, being fully or partially melted, or adhering to melted build material as powder). Therefore, a dimension of the object(s) may be larger than the regions to which fusing agent is applied. In order to compensate for the fact that objects may tend to 'grow' during manufacture in this manner, the object volume as described in the object model data may be reduced.

In other examples, objects may be smaller following object generation than is specified when printed. For example, some build materials used to generate objects may shrink during the object generation phase, for example due to densification of build material. For example, shrinkage may occur on cooling the generated object.

In some examples, dimensional compensation may be applied to compensate for expansion or shrinkage that may depend on a location of the object with a fabrication chamber or fabrication zone within the additive manufacturing apparatus. For example, in a particular apparatus, it may be the case that if an object is printed at the bottom of the fabrication chamber one or multiple portions of the object may tend to 'shrink' in at least one direction, whereas if the same object is printed at the top of the fabrication chamber one or multiple portions of the object may tend to 'grow' in at least one direction.

For example in some cases (for example in object generation operations using a particular apparatus and/or a particular build material), fabricated parts may cool while a build operation continues. Such parts may shrink on cooling. This can result in a drop in the height of the processed portion of the build job.

In some apparatus, when a new layer of build material is added, this may be added with reference to the base of the fabrication. If the existing material has shrunk, this may mean that at least one layer formed later in the build operation may be thicker than those formed earlier in the build operation. For example, if powder is to be added up to a particular level in the fabrication chamber, or if excess powder is removed by a bar at a particular build volume height for each layer, if the layers below have shrunk, this may result in more building material being added. In this case there may be proportionally more material in the upper layers so that when the object is fully cooled, the upper layers may be proportionally larger than the lower layers.

Dimensional shrinkage or expansion of parts may also be caused by other effects of the particular additive manufacturing apparatus. Therefore, a dimensional compensation may be applied to the object model data prior to generating the object to adjust the size of the object, or parts of the object up or down to compensate for expansion or shrinkage that may result depending on whereabouts in the fabrication chamber the object is generated.

In some examples, a modification may be specified using scaling and/or offset parameters (for example, a scaling factor and/or an offset factor). A scaling factor may be used to multiply all specified dimensions (in direction of a given axis or axes) by a value, which may be greater than 1 in order to increase the dimensions and less than 1 to reduce the dimensions. An offset factor may specify, for example by a specified distance or a number of defined sub volumes or 'voxels' (i.e. three dimensional pixels), an amount to add or remove from a surface of the object (or a perimeter within a layer), in some examples in the direction of a given axis or axes. For example, a distance as measured in the direction of a normal from the object surface may be specified and the object may be eroded or dilated (i.e., inflated or enlarged) by this distance. In some examples, where scaling is not indicated in a given dimension, the scaling factor in relation to that dimension may be set to 1, and if no offset is indicated in a given dimension, the offset factor in relation to that dimension may be set to 0.

In one example, the dimensional compensation comprises three scaling factors (one for each of the three orthogonal dimensions) and three offset factors (one for each of the three orthogonal dimensions). As noted above, if scaling is not indicated in a given dimension, the scaling factor in relation to that dimension may be set to 0, and if no offset is indicated in a given dimension, the offset factor in relation to that dimension may be set to 0.

In some examples the dimensional compensation to apply may be determined for example based on a thermal profiling of a build chamber of an additive manufacturing apparatus. In some examples, dimensional compensations are predetermined and are retrievable for, for example a mapping resource relating dimensional compensations to object placement locations.

In some examples, the dimensional compensation may include a global dimensional compensation factor, which may be applied to the object model data regardless of the expected object placement position, and which may provide a global dimensional scaling and/or offset compensation for a particular model of additive manufacturing apparatus. In addition to, or instead of the global dimensional compensation value, the dimensional compensation comprises a location based dimensional compensation factor which may provide dimensional compensation based on a location in the fabrication chamber where the object is to be printed. In some examples, an assumption may be made about the existing build height in the chamber before generation of the object. For example, it may be assumed that the existing build height in the chamber before generation of the object may be zero (not including, for example, any calibration or other layers that may be printed before generation of an object). That is, an assumption may be made that the object will not be built on top of an existing build operation, when the dimensional compensation is calculated and applied.

However, in practice, the location where the object is generated in the fabrication chamber may be different from the expected location for which the dimensional compensation was calculated. For example, if the packing of the parts is modified in some way after applying the dimensional compensation but before printing, or if a build operation containing the object is added on top of another build operation rather than being printed at the bottom of the fabrication chamber, as may have been expected when the dimensional compensation was initially applied to the object model data. In these situations, the dimensional compensation that has been applied to the object may no longer be valid and using the object model data with the applied dimensional compensations for printing could result in inaccuracies in the size of a printed object.

In some examples, a number of virtual sub-portions may be defined within the fabrication chamber or zone, with each virtual sub-portion corresponding to a physical region of the fabrication chamber and being assigned to a different task. For example, 'space' within a fabrication chamber may be available to and/or utilised by (for example, sold to) different users. The units of 'space' are described herein as virtual sub-portions. Therefore, each virtual sub-portion may be used for separate job, representing a batch of objects or an object. Depending on data processing times for processing of the contents of each virtual sub-portion, and due to the need for additive manufacturing processes to be substantially continuous once they have started, the order in which the virtual sub-portions are defined within the fabrication chamber, and therefore the order in which the objects are built, may be rearranged. If virtual sub-portions are reordered, the contents of the virtual sub-portion may be located in a different area of the fabrication zone than the location assumed when dimensional compensation was applied. In this case, dimensional compensations that have been applied to objects in a particular virtual sub-portion may no longer be valid.

The method comprises, at block 102, receiving, from the additive manufacturing apparatus, an indication of an object generation placement position within a fabrication chamber where the object is to be generated. For example, block 102 may comprise receiving an indication of an existing height of any additive manufacturing build operation within the additive manufacturing apparatus. For example, block 102 may comprise receiving a height of a platform or print bed on which object is being generated, such as a z-position of a stage which is to move down relative to a fabrication chamber as the object is generated, or by determining an existing number of build layers in the fabrication chamber that have already been formed and processed, for example, selectively solidified. In another example, the indication may comprise an indication of a planned or intended height of an additive manufacturing build operation at the point at which the object described by the object model data described in relation to block 100 is to be generated.

The method may comprise determining, from the indication of the existing height, an object generation placement position. For example, the method may comprise determining, from the relative height of a print bed in a fabrication chamber, whereabouts in the fabrication chamber the object is to be generated.

Block 106 of the method comprises comparing the expected object placement position with the (actual intended) object generation placement position. If the expected object placement position matches, or corresponds to the object generation placement position, the method proceeds to block 108 which comprises determining that the dimensional compensation is valid. Otherwise, the method proceeds to block 110 which comprises determining that the dimensional compensation is invalid.

In some examples, determining if the expected object placement position matches the object generation placement position may comprise determining whether there is an exact match between the expected object placement position and the object generation placement position. In some examples, determining if the expected object placement position matches the object generation placement position may comprise determining whether a magnitude of a difference between the expected object placement position and the object generation placement position is within a predefined tolerance. For example, if the difference is less than a predetermined threshold amount, the method may determine that the dimensional compensation is within an acceptable tolerance and may then determine that the expected object placement position matches the object generation placement position and that the dimensional compensation is therefore valid.

Therefore, the method of FIG. 1 performs a validation check on the object model data before printing to determine whether dimensional compensations that have been applied to the object model data are accurate or not. This can give an opportunity to cancel or pause the job, for example, if inaccuracy in the dimensional compensation is unacceptable for a particular job, which can reduce wasted time and materials caused by printing objects that do not meet particular standards. In other examples, new dimensional compensations may be determined based on the actually intended fabrication height.

Figure 2:
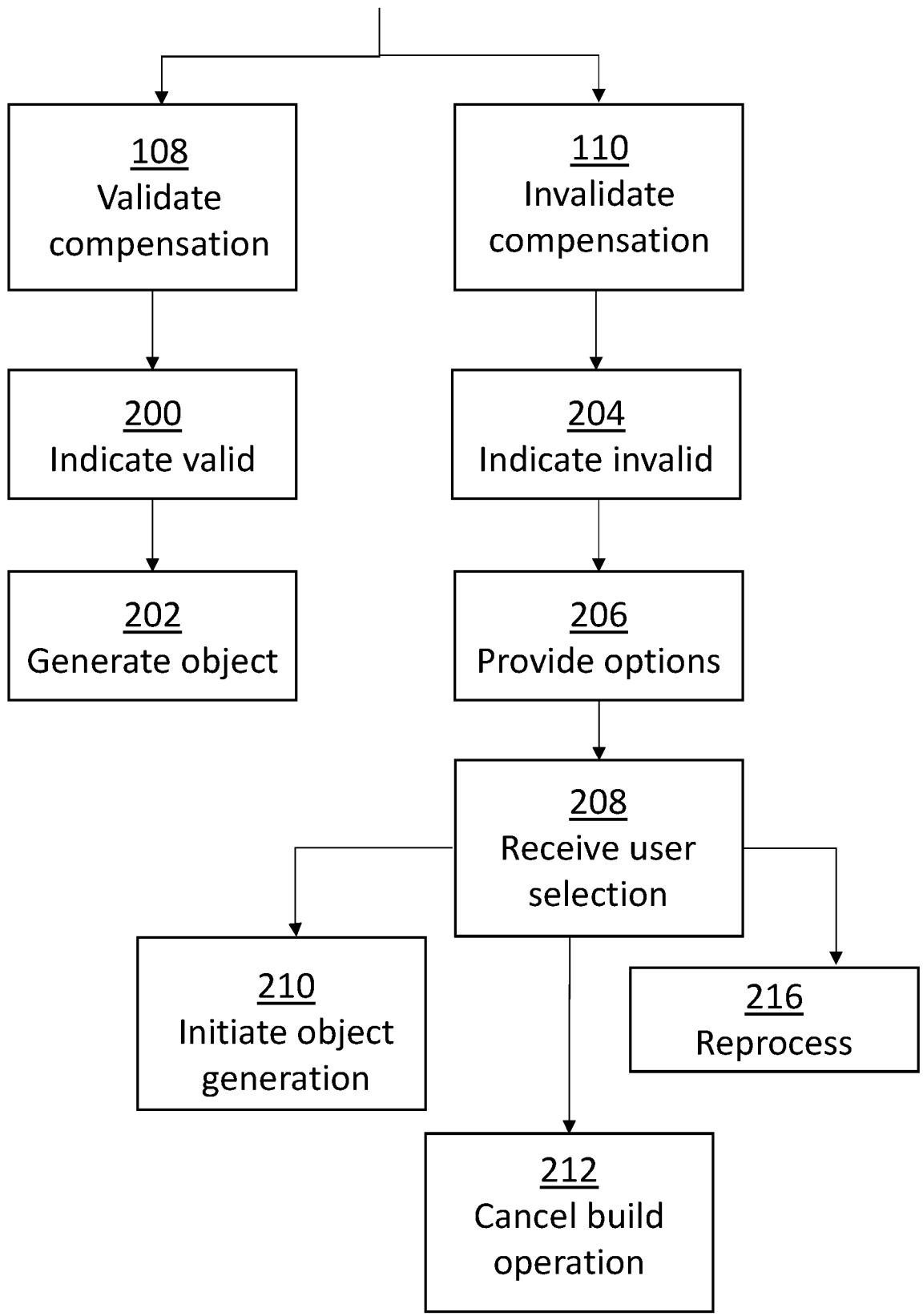
FIG. 2 is a flowchart of another example method of performing a validation check on object model data.

FIG. 2 shows a method which may include blocks 100 to 106 (not shown) and 108 and 110 of FIG. 1 along with additional blocks 200 to 214. For example, following blocks 108 and 110, as described in relation to FIG. 1, FIG. 2 comprises, at block 200, if the compensation is determined to be valid, providing an indication of whether the dimensional compensation is determined to be valid or invalid. In some examples, the indication may be a notification to a user of the additive manufacturing apparatus. In some examples, the indication may be a signal sent to the additive manufacturing apparatus, for example a signal to indicate to the additive manufacturing apparatus that the dimensional compensation validation has been passed and therefore generation of the object may commence.

If the dimensional compensation is determined to be valid, the method of FIG. 2 comprises, at block 202, causing the additive manufacturing apparatus to generate the object. In some examples, block 202 may comprise generating the object by the additive manufacturing apparatus. In some examples, the method may comprise automatically causing the additive manufacturing apparatus to generate the object in response to determining that the compensation is valid. In other examples, the method may comprise notifying a user that the compensation is valid, and sending an instruction to the additive manufacturing apparatus to generate the object in response to a user input, or in response to another initiation signal, such as determining that other checks have been completed for the object model data, in addition to the dimensional compensation validation If the dimensional compensation is determined to be invalid at block 110, the method of FIG. 2 may comprise, at block 204, providing an indication that the dimensional compensation is determined to be invalid. For example, block 204 may comprise providing a notification to a user that the dimensional compensation is invalid, or sending a signal to the additive manufacturing apparatus indicating that the dimensional compensation is invalid.

Providing a notification to a user that the compensation is valid or invalid may improve the interface between the user and an additive manufacturing system which may enables a user to monitor an additive manufacturing system more easily.

In some examples, if the compensation is determined to be invalid, the method may comprise sending a signal to the additive manufacturing apparatus to automatically cancel the build operation. In the method of FIG. 2, if the compensation is determined to be invalid, the method proceeds to block 206 which comprises providing selectable options to a user of the additive manufacturing apparatus to cancel generation of the object or proceed with generation of the object or to reprocess the dimensional compensation based on the object generation placement position (i.e. the actual position within the fabrication zone where the object will be generated). In some examples, providing options to the user may include determining an estimation of a length of time to perform a dimensional compensation to the object based on the object generation placement position for example, by retrieving a length of time taken to perform the dimensional compensation based on the expected object placement position, which may be stored in a database as part of the object model data. Block 206 may comprise comparing the estimated length of time with a length of time until object generation is to begin and if the estimated time is less than the time until object generation is to begin, including an option to perform a (new) dimensional compensation to the object based on the object generation placement position in the options provided to the user, or otherwise not including this option (if the estimated processing time is longer than the time left before the object generation is to begin). In some examples, if the estimated reprocessing time is less than the time until building is to begin, the method may include automatically reprocessing the dimensional compensation for the object. In some examples, the time left before object generation is to begin may be determined by determining the remaining printing time for a job or job(s) being generated or due to be generated by the additive manufacturing apparatus prior to generation of the object. This may enable the additive manufacturing process to be substantially continuous.

Providing options to a user of proceeding with generating the object, cancelling the build operation or reprocessing the dimensional compensation enables the method to be flexible. The method can therefore be used by the user for different applications, for example when different accuracy constraints and time constraints may be placed on the build operation.

Block 208 of the method of FIG. 2 comprises receiving a selection from a user. Based on the user selection the method may proceed to block 210, block 212 or block 214. Block 210 comprises sending a signal to the additive manufacturing apparatus to proceed with generating the object, even though the dimensional compensation has been determined to be invalid. The user may select this option, for example, if size accuracy of the object is not a priority. Block 212, comprises sending a signal to the additive manufacturing apparatus to cancel the build operation. This option may be selected, for example, if size accuracy of the object is a high priority and if there is not enough time or available processing power to reprocess the dimensional compensation. Block 214 comprises reprocessing the dimensional compensation for the object. That is, block 214 comprises performing a dimensional compensation to the object based on the object generation placement position, i.e. on the actual location within the fabrication zone where the object will be generated by the additive manufacturing apparatus. Reprocessing may ensure that the dimensional compensation of the generated object will be accurate even though the object is to be built in an area of the fabrication chamber which is different from that originally modelled. In some examples, after the dimensional compensation has been reprocessed, the method may comprise automatically sending an instruction to the additive manufacturing apparatus to commence generation of the object in the object generation placement position. Although the method of FIG. 2 comprises providing a user with options to generate the object, cancel the build operation or reprocess the dimensional compensation, in some examples, the user selectable options could comprise any two of these options, for example options to cancel the build operation and generate the object.

In some examples where a magnitude of a difference between the expected object placement position and the object generation placement position is determined, the method may comprise providing information of the determined magnitude to a user. This may assist the user in deciding whether to continue with, or cancel the build operation as smaller differences in the placement positions may result in smaller differences in the dimensional compensation.

In some examples, the method may comprise automatically instructing the additive manufacturing apparatus to proceed with, cancel or reprocess a particular job based on the magnitude of the difference in placement positions.

Figure 3:
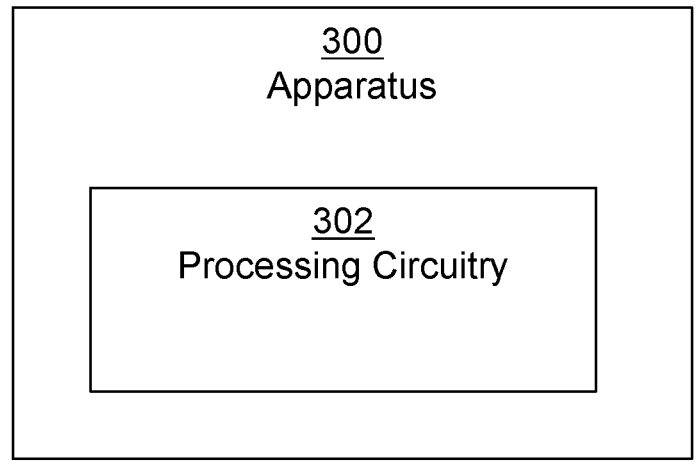
FIG. 3 is a simplified schematic representation of an example apparatus for performing a validation check on object model data.

FIG. 3 shows an apparatus 300 comprising processing circuitry 302. The processing circuitry 302, in use of the apparatus 300, is to receive object model data representing at least a portion of an object that is to be generated by an additive manufacturing apparatus by fusing build material within a fabrication chamber, for example by a thermal fusion process—the object model data having been modified by a dimensional compensation calculated for a predetermined object placement position within the fabrication chamber. The processing circuitry 302, in use of the apparatus, is to receive, from the additive manufacturing apparatus, an indication of a location within a fabrication chamber where the object is to be generated. The processing circuitry 302 is then to compare the received indication of the location with the predetermined object placement position and if the received location corresponds to the predetermined object placement position, output a notification indicating that the applied dimensional compensation is confirmed and, if the received location does not correspond to the predetermined object placement position, to output a notification indicating that the applied dimensional compensation is not confirmed. In some examples, the apparatus may comprise a display and the processing circuitry may cause the display to display the notification.

In some examples, the apparatus 300 may comprise an additive manufacturing apparatus. In some examples, the apparatus 300 may, in use, be in communication with an additive manufacturing apparatus, for example, over a wireless network, an Ethernet link or via another suitable communication link.

Figure 4:
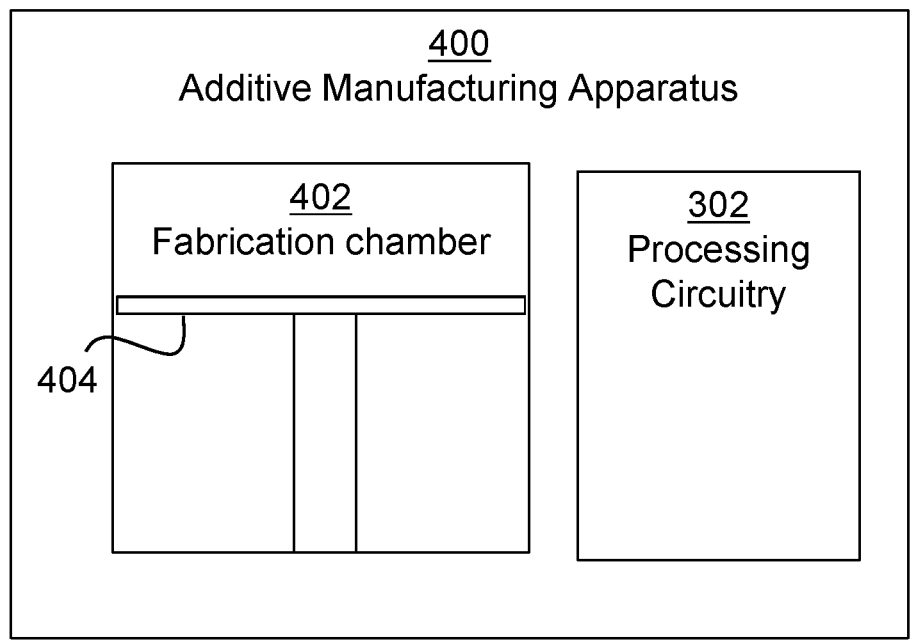
FIG. 4 is a simplified schematic representation of an example apparatus for performing additive manufacturing.

FIG. 4 shows an additive manufacturing apparatus comprising processing circuitry 302 as has already been described in relation to FIG. 3. The additive manufacturing apparatus 400, in use thereof, generates the object in a plurality of layers (which may correspond to respective slices of an object model) according to object generation instructions which may be generated from the object model data. The additive manufacturing apparatus 400 may for example generate an object in a layer-wise manner by selectively solidifying portions of layers of build materials. The selective solidification may in some examples be achieved by selectively applying print agents, for example through use of 'inkjet' liquid distribution technologies, and applying energy, for example heat, to the layer. The additive manufacturing apparatus 400 further comprises a fabrication chamber 402 comprising a print bed 404. In this example, as object(s) are generated, the print bed 404 moves downwards in the fabrication chamber.

As noted above, in some examples, the existing height of any additive manufacturing build operation within the additive manufacturing apparatus may be determined by determining the height of a platform or print bed. In practice, a fabrication chamber 402 comprising a print bed 404 may comprise a removable/interchangeable component of the additive manufacturing apparatus 400.

The additive manufacturing apparatus 400 may comprise additional components not shown herein, for example any or any combination of, print head(s) for distributing print agents, a build material distribution system for providing layers of build material, energy sources such as heat lamps and the like.

The object generation instructions may, in use thereof, control the additive manufacturing apparatus 400 to generate each of a plurality of layers of the object. This may for example comprise specifying area coverage(s) for print agents such as fusing agents, colorants, detailing agents and the like. In some examples, object generation parameters are associated with object model sub-volumes. In some examples, other parameters, such as any, or any combination of heating temperatures, build material choices, an intent of the print mode, and the like, may be specified. In some examples, halftoning may be applied to determined object generation parameters to determine where to place fusing agent or the like. The control data may be specified in association with sub-volumes.

The apparatus 300 or 400, and/or the processing circuitry 302 thereof, may carry out any of the blocks of FIG. 1 or 2.

Figure 5:
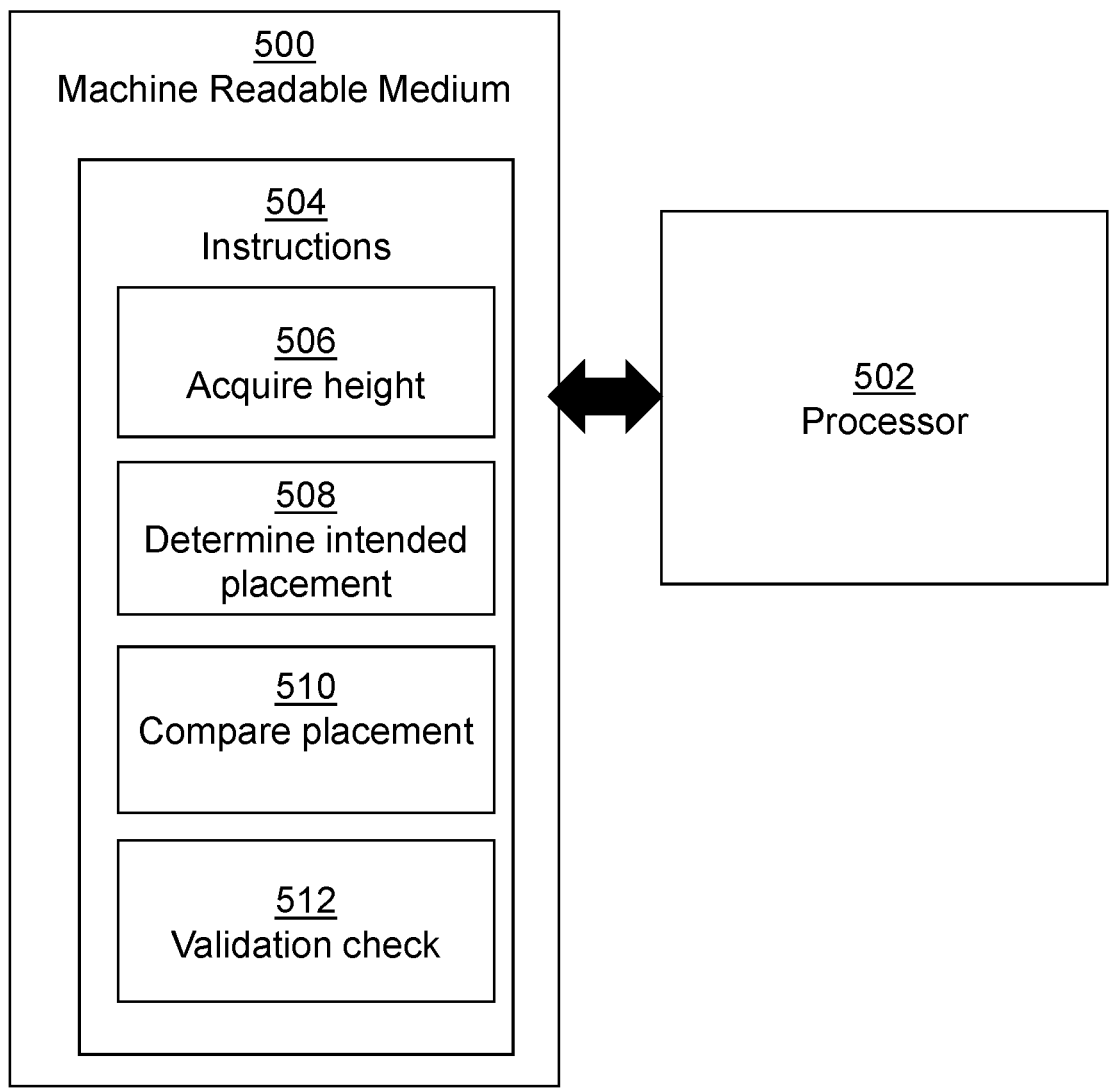
FIG. 5 is a simplified schematic representation of an example machine readable medium associated with a processor.

FIG. 5 shows a machine readable medium 500 associated with a processor 502. The machine readable medium 500 comprises instructions 504 which, when executed by the processor 602, cause the processor 602 to carry out tasks. In this example, the instructions 504 comprise instructions 506 to cause the processor 502 to on receipt of data defining an object to be generated in an additive manufacturing apparatus fabrication zone, wherein a dimensional compensation has been applied to the object based on an expected vertical placement, acquire an indication of an existing height of any additive manufacturing build operation within the additive manufacturing apparatus fabrication zone and instructions 508 to, based on the height, determine an intended vertical placement of the object. The instructions 504 also comprise instructions 510 to compare the intended vertical placement of the object with the expected vertical placement of the object, and instructions 512 to, if the intended vertical placement corresponds to the expected vertical placement, pass a validation check for the object and otherwise fail the validation check for the object.

In some examples, the instructions when executed cause the processor 502 to carry out any of the blocks of FIG. 1 or 2. In some examples, the instructions may cause the processor to act as the processing circuitry 302 of FIG. 3 or FIG. 4

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. The term 'processor' is to be interpreted broadly to include a CPU, processing unit, ASIC, logic unit, or programmable gate array etc. The methods may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   prior to generating an object using an additive manufacturing apparatus by fusing build material within a fabrication chamber, receiving, at a processor, object model data representing the object, wherein a dimensional compensation has been applied to the object model data based on an expected object placement position;
   prior to generating the object using the additive manufacturing apparatus, receiving, from the additive manufacturing apparatus, an indication of an object generation placement position within the fabrication chamber where the object is to be generated;
   prior to generating the object using the additive manufacturing apparatus comparing, by the processor, the expected object placement position with the object generation placement position; and
   in response to the expected object placement position matching the object generation placement position, determining, by the processor, that the dimensional compensation is valid and causing the additive manufacturing apparatus to generate the object.

2. The method according to claim 1 further comprising providing an indication of whether the dimensional compensation is determined to be valid or invalid.

3. The method according to claim 1, further comprising:
   in response to determining that the expected object placement position does not match the object generation placement position, determining, by the processor, that the dimensional compensation is invalid;
   permitting, by the processor, a user of the additive manufacturing apparatus to cancel generation of the object or proceed with generation of the object; and
   causing, by the processor, the additive manufacturing apparatus to cancel or proceed with generation of the object based on the user's selection.

4. The method according to claim 1 further comprising:
   in response to determining that the expected object placement position does not match the object generation placement position, determining, by the processor, that the dimensional compensation is invalid;
   providing, by the processor, a user with a selectable option to perform an updated dimensional compensation to the object based on the object generation placement position; and
   in response to receiving a user selection, processing, by the processor, the updated dimensional compensation based on the object generation placement position.

5. The method according to claim 1, further comprising:
   in response to determining that the expected object placement position does not match the object generation placement position, determining, by the processor, that the dimensional compensation is determined to be invalid; and
   determining, by the processor, an estimation of a length of time to perform an updated dimensional compensation to the object based on the object generation placement position.

6. The method according to claim 5, wherein the estimate is based on a length of time taken to perform the updated dimensional compensation based on the expected object placement position.

7. The method according to claim 5, further comprising:
   comparing, by the processor, the estimated length of time with a length of time until object generation is to begin at the additive manufacturing apparatus; and
   in response to the estimated time being less than the time until object generation is to begin, providing a user with an option to perform an updated dimensional compensation to the object based on the object generation placement position.

8. The method according to claim 1, wherein receiving the indication of an object generation placement position within the fabrication chamber comprises receiving an indication of a height of a build platform of the additive manufacturing apparatus.

9. An apparatus comprising: a processor;
   a non-transitory computer-readable data storage medium storing instructions executable by the processor to:
   prior to generating an object using an additive manufacturing apparatus by fusing build material within a fabrication chamber, receive object model data representing the object, the object model data having been modified by a dimensional compensation calculated for a predetermined object placement position within the fabrication chamber;
   prior to generating the object using the additive manufacturing apparatus, receive, from the additive manufacturing apparatus, an indication of a location within the fabrication chamber where the object is to be generated;
   prior to generating the object using the additive manufacturing apparatus, compare the received indication of the location with the predetermined object placement position; and
   in response to the received location corresponding to the predetermined object placement position, determine that the dimensional compensation is valid and cause the additive manufacturing apparatus to generate the object.

10. The apparatus according to claim 9, further comprising a display to display an output notification indicating that the dimensional compensation is valid.

11. The apparatus according to claim 9, wherein the apparatus is the additive manufacturing apparatus.

12. The apparatus according to claim 9, wherein the indication of a location within the fabrication chamber where the object is to be generated is based on an existing height of any additive manufacturing build operation within the additive manufacturing apparatus.

13. A non-transitory machine-readable medium comprising instructions which when executed by a processor cause the processor to:
   prior to generating an object using an additive manufacturing apparatus by fusing build material within a fabrication chamber, receive data defining the object, wherein a dimensional compensation has been applied to the data defining the object based on an expected vertical placement;

prior to generating the object using the additive manufacturing apparatus, acquire an indication of an existing height of any additive manufacturing build operation within the additive manufacturing apparatus fabrication;

prior to generating the object using the additive manufacturing apparatus, determine an intended vertical placement of the object based on the height;

prior to generating the object using the additive manufacturing apparatus, compare the intended vertical placement of the object with the expected vertical placement of the object; and in response to the intended vertical placement corresponding to the expected vertical placement, determine that the dimensional compensation is valid and cause the additive manufacturing apparatus to generate the object.

14. The non-transitory machine-readable medium according to claim 13, wherein the instructions when executed by the processor further cause the processor to:

in response to the intended vertical placement not corresponding to the expected vertical placement, determine that the dimensional compensation is invalid;

permit a user of the additive manufacturing apparatus to cancel generation of the object or proceed with generation of the object; and cause the additive manufacturing apparatus to cancel or proceed with generation of the object based on the user's selection.

* * * * *